United States Patent [19]

Bernard et al.

[11] Patent Number: 5,004,342

[45] Date of Patent: Apr. 2, 1991

[54] MEASURING DEVICE HAVING A LASER AND A RING RESONATOR

[75] Inventors: Walter Bernard, Meersburg; Joachim G. Heppner, Tamm; Karl H. Schwarz, Owingen, all of Fed. Rep. of Germany

[73] Assignee: Bodenseewerk Geratetechnik GmbH, Überlingen, Fed. Rep. of Germany

[21] Appl. No.: 181,214

[22] Filed: Apr. 13, 1988

[30] Foreign Application Priority Data

Apr. 15, 1987 [DE] Fed. Rep. of Germany ....... 3712815

[51] Int. Cl.$^5$ .................. G01B 9/02; G01C 19/64
[52] U.S. Cl. ........................................ 356/350; 372/94
[58] Field of Search ........................... 356/350; 372/94

[56] References Cited

U.S. PATENT DOCUMENTS

| | | | |
|---|---|---|---|
| 4,405,236 | 9/1983 | Mitsuhashi et al. | 356/350 |
| 4,661,964 | 4/1987 | Haavisto | 356/350 X |
| 4,681,446 | 7/1987 | Yeh | 356/350 |

FOREIGN PATENT DOCUMENTS

| | | |
|---|---|---|
| 0213965 | 9/1986 | European Pat. Off. . |
| 2821241 | 11/1979 | Fed. Rep. of Germany . |
| 3131232 | 4/1982 | Fed. Rep. of Germany . |
| 3330660 | 3/1985 | Fed. Rep. of Germany . |
| 3426868 | 1/1986 | Fed. Rep. of Germany . |
| 3438184 | 4/1986 | Fed. Rep. of Germany . |
| 3500633 | 10/1986 | Fed. Rep. of Germany . |
| 3615916 | 4/1987 | Fed. Rep. of Germany . |
| 56-90584 | 7/1981 | Japan . |
| 2182139 | 5/1987 | United Kingdom . |

*Primary Examiner*—Vincent P. McGraw
*Attorney, Agent, or Firm*—Lee, Mann, Smith, McWilliams & Sweeney

[57] ABSTRACT

A measuring device for angular rates making use of the Sagnac-effect comprises a ring resonator (12) and a laser (10). The ring resonator (12) forms a part of the resonator cavity of the laser (10). Thereby no precautions to achieve an optical insulation between laser and ring resonator have to be taken. A semiconductor laser serves as laser. Different embodiments of the ring resonator having mirrors, an integrated optical system and a fiber optical system are described.

23 Claims, 4 Drawing Sheets

MEASURING DEVICE HAVING A LASER AND A RING RESONATOR

TECHNICAL FIELD

The invention relates to a measuring device having a laser and a ring resonator, in which the ring resonator is variable by a physical quantity to be measured, according to the preamble of claim 1.

The variation of the ring resonator can be effected due to the Sagnac-effect, when the measuring device rotates relative to inertial space. Then the resonant frequency of the light propagating around in the ring resonator in one direction of propagation will be different from the resonant frequency of the light propagating around in the opposite direction of propagation. These differences can be used for forming a measuring value for the angular rate. This is the preferred application of the invention. The measuring device can, however, also serve for measuring magnetic fields by making use of the Farday-effect in a ring resonator. Other applications are the measuring of variations in a ring resonator induced by temperature or pressure, or the measuring of accelerations by making use of the photo-elastic effect in a ring resonator.

BACKGROUND ART

In known measuring devices for measuring the Sagnac-effect, light from a laser is coupled into a ring resonator in two opposite directions of propagation. When the measuring device is rotated about an axis perpendicular to the plane of the ring resonator the effective optical path lengths of the light waves propagating around are varied oppositely for one and the other opposite direction of propagation. This variation can be used for measuring the angular rate.

Such a measuring device having a passive ring resonator is described, for example, in U.S. Pat. No. 4,135,822.

With such measuring devices having a passive ring resonator the problem rises, that the light coupled out of the laser into the ring resonator in two opposite directions of propagation leaves the ring resonator through the respective opposite coupling-in paths and returns to the laser. Particularly when the emitted light frequency of the laser gets into resonance in the ring resonator, this proportion of the light coupled back can be considerable. This coupling-back of the light leads to the fact, that the laser responds to the resonance of the outer ring resonator. This is always unwelcome when the frequency of the laser is to be modulated independently, which is necessary in many measuring devices for measuring the Sagnac-effect. Therefore it is known to provide an "optical insulation" or some kind of "optical diode" between the laser and the ring resonator.

In the above mentioned U.S. Pat. No. 4,135,822, acousto-optical modulators (Bragg cells) are provided as such optical diodes.

It has been found that the desired optical diode effect can be achieved only incompletely. Particularly when semiconductor lasers are used, degrees of insulation smaller than $10^{-6}$ are required to let the laser be unaffected by its own light. Such a degree of insulation cannot be achieved with Bragg cells. Also by other methods, such a degree of insulation can only be achieved with considerable expenditure.

DISCLOSURE OF INVENTION

It is the object of the invention to avoid the problems related to the necessity of an optical insulation between laser and ring resonator.

According to the invention this object is achieved by the characteristics mentioned in the characterizing part of claim 1.

Thus, the necessity of an optical insulation between laser and ring resonator is avoided. Rather forms the optical back-coupling between ring resonator and laser the principle of function of the invention.

Furthermore, by the purposeful back-coupling of the light from the ring resonator into the laser, additionally a spectral constriction of the laser is achieved. This makes it possible to use semiconductor lasers as light source. Semiconductor lasers are inexpensive. However, they are very wide-banded. This is due to the poor resonator quality of the semiconductor laser. Therefore, semiconductor lasers are normally not very suitable for the measurement of the Sagnac-effect. In the measuring device according to the invention the ring resonator present anyway for the measuring of the Sagnac-effect (or other measuring quantities) can be used to improve the band width of a semiconductor laser.

When the ring resonator forms a part of the resonator cavity of the laser, then an oscillation of the laser can only take place, when the frequency of the laser light corresponds to the proper frequency of the ring resonator. When the measuring device makes a rotational movement about an axis perpendicular to the plane of the ring resonator, the resonant frequencies of the ring resonator for one and the other direction of propagation are mutually shifted.

By the modulation of the optical path in the resonator cavity of the laser a signal results, which represents the derivative of the signal with respect to the—modulated—phase. When the frequency of the laser is stabilized in the maximum of the resonance curve for one direction of propagation in the ring resonator, the demodulated signal obtained in the opposite direction of propagation is directly indicative of, for example, the angular rate of the measuring device. When the laser amplifier is operated in complete saturation, the signal is a linear function of, for example, the angular rate over a quite large range.

Advantageous modifications of the invention are subject matter of the sub-claims.

BRIEF DESCRIPTION OF THE DRAWINGS

Some embodiments of the invention will now be described in detail with reference to the accompanying drawings.

BEST MODE OF CARRYING OUT THE INVENTION

Figure 1:
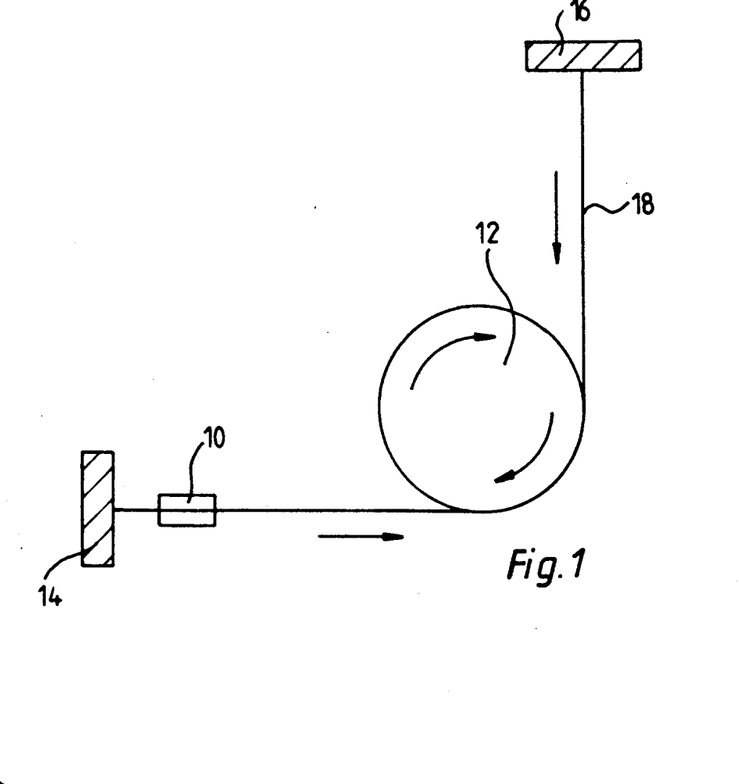
FIG. 1 illustrates the principle of the measuring device.

In FIG. 1 numeral 10 designates a laser. The laser 10 can be a semiconductor laser. The laser 10 is coupled with a ring resonator 12 such that it generates a light wave in the ring resonator 12, which light wave propagates in a first direction of propagation, namely counter-clockwise in FIG. 1. A mirror 14 is arranged on the side of the laser 10 remote from the ring resonator. This mirror 14 limits the resonator cavity of the laser 10 on one side. Conventionally a further partially transparent mirror would be arranged on the opposite side of the laser 10, these two mirrors determining the resonator cavity of the laser therebetween. This second mirror is omitted in the described measuring device Instead thereof, an end reflector 16 on the side of the ring resonator likewise in the form of a mirror is arranged on the other side of the ring resonator 12 as viewed from the laser 10. Part of the light propagating in the first direction of propagation is coupled out of the ring resonator 12 for example by means of a waveguide 18 and directed to the end reflector 16. The end reflector 16 reflects the light back into in self. Part of this light reflected back by the end reflector 16 propagates to the laser 10 and mirror 14. Thus, the end reflector 16 together with the mirror 14 limits a resonator cavity of the laser 10. Part of the light reflected back by the end reflector is, however, coupled into the ring resonator 12. This light generates, in the ring resonator, a light wave, which propagates around in the ring resonator 12 in an opposite second direction of propagation, namely clockwise in FIG. 1.

Between the end mirrors 14 and 16 a "linear resonator" is formed, which comprises the laser 10. This linear resonator should be in resonance with the ring resonator 12.

Figure 2:
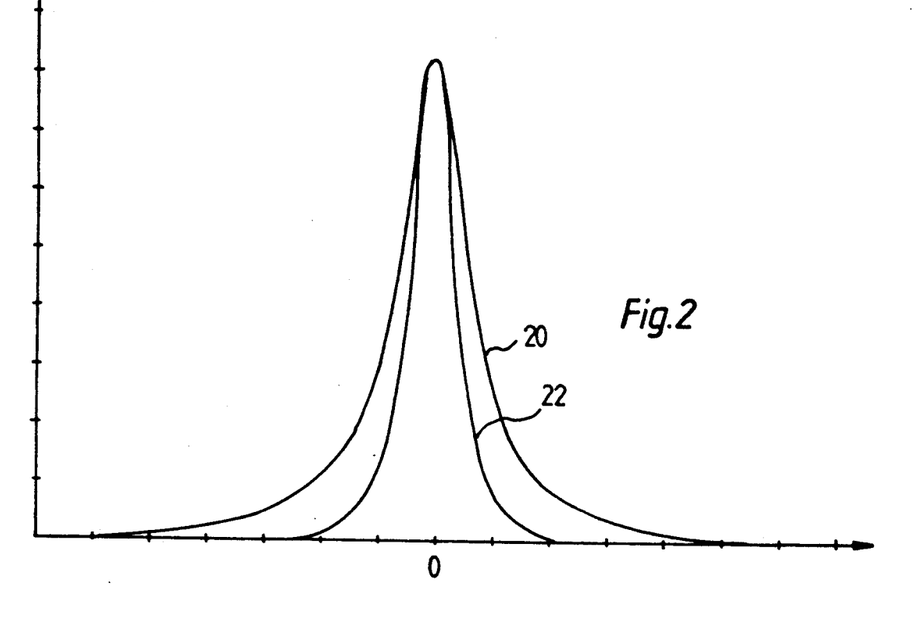
FIG. 2 is a diagram and shows the intensity of the light propagating around in the ring resonator as a function of the phase.

In FIG. 2 the intensities of the light waves propagating in the ring resonator 12 in the first and the second directions of propagation as referenced to the intensity actually coupled in, that is practically the transmission of the ring resonator 12, are illustrated as a function of the phase, that is practically the optical path of the ring resonator 12. The phase "0" means that the optical path of the ring resonator 12 corresponds to a whole multiple of the wavelength of the light wave propagating around in the ring resonator. This phase corresponds to a certain frequency of the light (or a sequence of frequencies corresponding to the modes of the laser). A frequency deviation from this value causes the phase of the light wave after having passed through the ring resonator 12 to be varied by a finite value. This is the abscissa of FIG. 2. The intensity or transmission curve is a bell curve. Two such curves 20 and 22 are illustrated in FIG. 2. The curve 20 corresponds to the light wave propagating around in the ring resonator 12 in the first direction of propagation. The curve 22 is more narrow and corresponds to the light wave propagating around in the ring resonator in the second direction of propagation. The light wave propagating around in the second direction of propagation is subjected to the filter action of the ring resonator 12 twice: Once a light intensity is coupled out through the waveguide 18, which is proportional to the intensity of the light wave propagating around in the first direction of propagation. This intensity follows the curve 20. Thereafter, this light wave is anew guided to the ring resonator in the opposite second direction of propagation, where it is subjected again to a weakening dependent on the transmission of the ring resonator 12 and thus on the phase according to the curve 20. The intensity or transmission curve 22 for the light wave propagating around in the second direction of propagation drops faster with deviation from the resonant frequency and thus from the phase "0".

Figure 3:
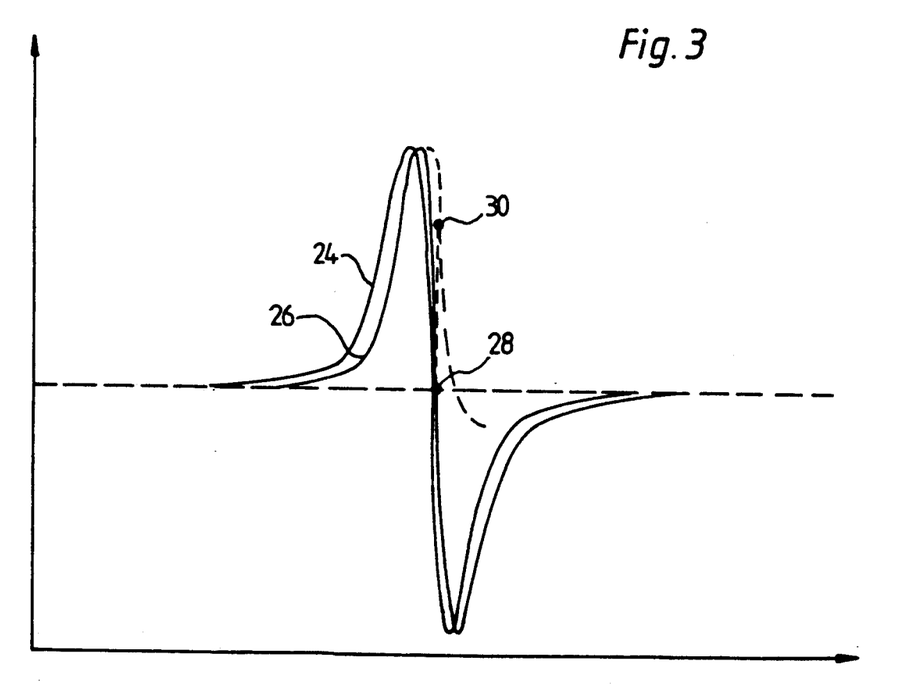
FIG. 3 is a diagram and shows the derivative of the intensity of the light propagating around in the ring resonator with respect to the phase as a function of the phase.

When the phase of the waves propagating around is modulated, these waves provide in photoelectrical detectors not shown in the schematic illustration of FIG. 1 alternating signals with the modulation frequency, the amplitudes of these signals being proportional to the slope of the curves 20 and 22, respectively, that is proportional to the derivatives of the curves 20 and 22 with respect to the phase. These derivatives are illustrated in FIG. 3 as curves 24 and 36, respectively. When the measuring system does not rotate relative to inertial space, the optical paths of the ring resonator 12 are equal for the first and the second directions of propagation. The two waves propagating around in opposite directions in the ring resonator 12 are in resonance at the same point at the phase "0". The laser operates at this frequency. Correspondingly, also the alternating signals obtained at the photoelectrical detectors due to the phase modulation are equal for the light wave in the first direction of propagation and the light wave in the second direction of propagation. The difference thereof is zero.

When, however, the measuring device rotates for example about an axis perpendicular to the plane of the ring resonator, the effective optical paths of the ring resonator are varied in opposite sense for the two light waves propagating around in opposite directions. Therefore, the frequencies are shifted, at which the light waves in one or the other direction of propagation are in resonance in the ring resonator, i.e. have the phase "0". Now measures can be taken to stabilize the frequency of the laser at the resonant frequency corresponding to one of the directions of propagation. Then the demodulated signal obtained from the light wave in the other direction of propagation is directly indicative of the angular rate of the measuring device. It can be imagined, that one curve in FIG. 3, for example curve 26, remains unchanged, such that the inflection point 28 is located at the phase "0". This phase corresponds to a changed frequency of the laser. Then the curve 24 is slightly displaced relative to the curve 26: At the same frequency, at which the laser is stabilized, a particular phase of the light wave in the second direction of propagation corresponds to a different phase of the light wave propagating around in the first direction of propagation and thus to another course of intensity or transmission, respectively. This is indicated by broken lines in FIG. 3. The signal amplitude corresponding to the point 30 in FIG. 3 and obtained from the light wave in the first direction of propagation at the frequency of the laser, that is the phase "0" of the light wave in the second direction of propagation, is directly indicative of the angular rate of the measuring device.

Figure 4:
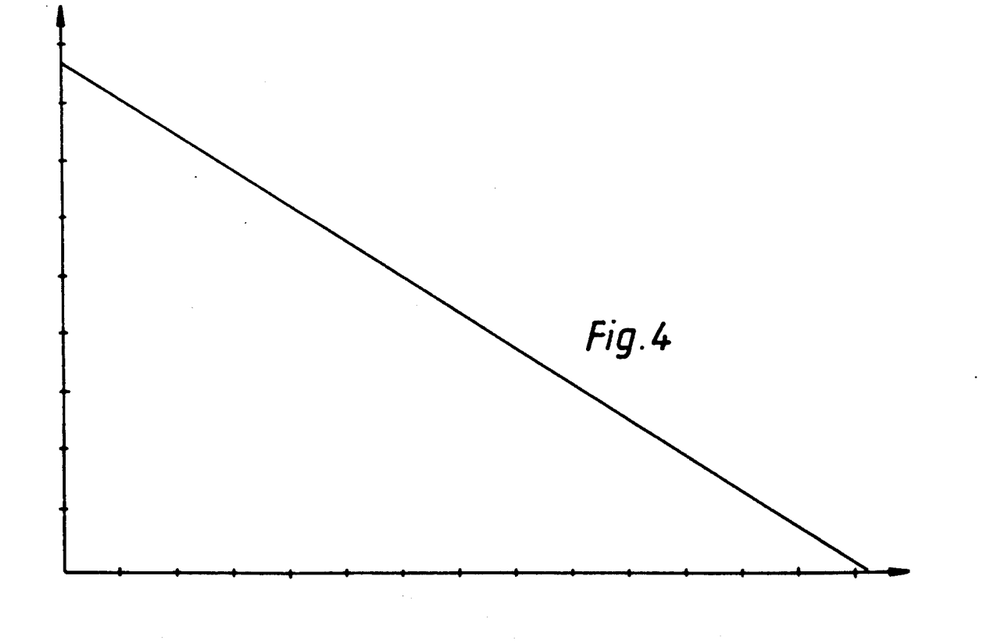
FIG. 4 is a diagram and shows the signal obtained with the measuring device as a function of the angular rate.

When the laser 10 is operated in complete saturation, the signal thus obtained is a linear function of the angular rate (or of another quantity affecting the ring resonator) over quite a large range. This is illustrated in FIG. 4.

Figure 5:
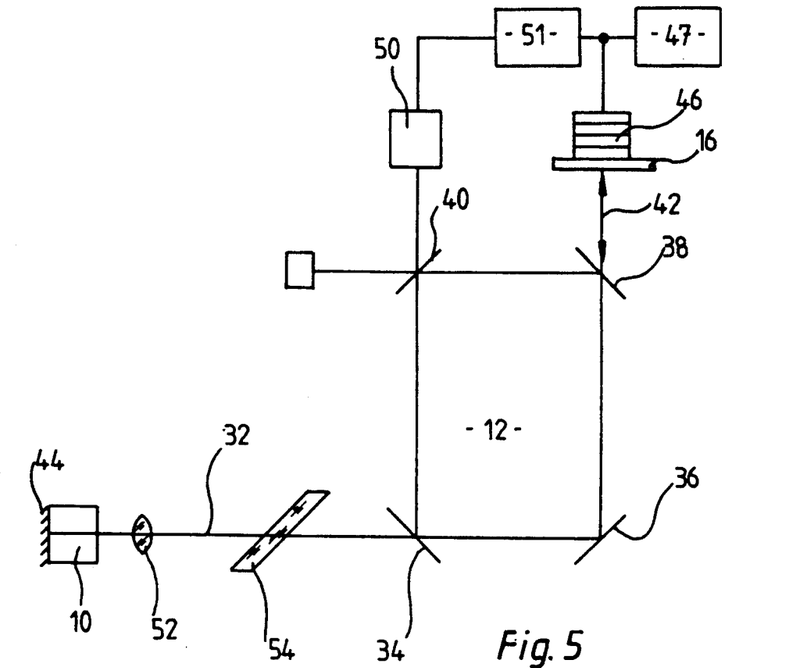
FIG. 5 is a schematic illustration of a realization of the measuring device with mirrors.

In FIG. 5 one mode of the practical realization of the above described principle is schematically illustrated, wherein the ring resonator is constructed with mirrors. Corresponding elements are designated by the same numerals in FIG. 5 as in FIG. 1.

A semiconductor laser 10 generates a laser beam 32, which is coupled into a ring resonator 12. The surface of the semiconductor laser on the side of the ring resonator is coated to reduce reflection by a reflection reducing layer. The ring resonator 12 consists of four mirrors 34, 36, 38 and 40. The mirrors 34, 36, 38 and 40 are arranged in the corner of a rectangle and inclined by 45° relative to the direction of the rays of a light beam propagating around in the ring resonator 12. In this way, the light beam is deflected by 90° at each mirror and thus passes along the sides of the rectangle. The mirror 34 is a partially transparent mirror. Thereby part of the light beam 34 emitted by the semiconductor laser is transmitted by the mirror 34 and thus coupled into the ring resonator. The mirror 36 is completely reflective. The mirror 38 is again a partially transparent mirror. The light reflected by the mirror 38 impinges upon the mirror 40. The mirror 40 is likewise a partially transparent mirror. The light reflected by the mirror 40 impinges upon the mirror 34 and is anew reflected thereby, at least partially, in the direction toward the mirror 36. The light coupled out of the semiconductor laser 10 into the ring resonator thus passes through the ring resonator in a first direction of propagation, namely counter-clockwise in FIG. 5.

The light passing the partially transparent mirror 38 impinges upon an end reflector 16 in the form of a completely reflective plane mirror, which is perpendicular to the direction of the rays of the partial light beam passing through the mirror 38. Thus the end reflector 16 reflects the impinging partial light beam 42 back again in the direction of incidence. The partial light beam 42 reflected at the end reflector partially passes again through the partially transparent mirror 38 and impinges upon the mirror 36. The mirror 36 deflects the light by 90° and directs it to the partially transparent mirror 34. The partially transparent mirror 34 reflects part of the light incident from the mirror 36 in the direction to the mirror 40. The mirror 40 again reflects part of the light from the mirror 38. The mirror 38 again partially reflects this light in the direction of the partial light beam passed through from the end reflector. Thus, from the end reflector, a light wave propagating around is coupled into the ring resonator 12, this light wave propagating around in the ring resonator 12 in a second direction of propagation opposite to the first direction of propagation. The second direction of propagation is clockwise in FIG. 5.

Thus, the end reflector 16 has, on one hand, the function to generate a light wave in the ring resonator, which light wave propagates around in the ring resonator in the second direction of propagation.

A part of the returning light reflected by the mirror 36 to the mirror 34 passes through the partially transparent mirror 34 and reaches the semiconductor laser 10. A reflecting layer 44 is provided on the side of the semiconductor laser 10 remote from the ring resonator 12. This reflecting layer 44 limits together with the end reflector 16 the resonator cavity of the semiconductor laser 10.

Thus, on the other hand, the end reflector 16 has the function to limit the resonator cavity of the semiconductor laser 10.

In the embodiment according to FIG. 5 the end reflector is located on a correcting element 46, which is longitudinally variable in the direction of the rays by an electrical signal. In the preferred embodiment according to FIG. 5, this correcting element is a piezo-actuator. A modulation signal is applied to the correcting element 46. Thus, the correcting element 46 and the mirror forming the end reflector 16 represent components of modulation means for modulation, namely phase modulation, of the laser light.

Thus, in the embodiment according to FIG. 5, the end reflector 16 has additionally a third function: It causes together with correcting element 46 a phase modulation of the light.

The part of the light propagating around in the ring resonator in the first direction of propagation and passing through the mirror 40, impinges upon a first photoelectrical detector 48. The part of the light propagating around in the ring resonator in the second direction of propagation and passing through the mirror 40, impinges upon a second photoelectrical detector 50. The signal from the detector 50 corresponding to the modulated intensity of the light in the second direction of propagation is applied to a controller 51. The component of the detector signal having the frequency of the phase modulation serves as input quantity of the controller. The output quantity of the controller is a d.c. voltage, which is applied to the correcting element 46 and causes a fixed displacement of the end reflector superimposed to the phase modulation oscillation. Thereby the semiconductor laser 10 is tuned to the resonant frequency of the light propagating around in the resonator cavity in the second direction of propagation.

A collimator optical system 52 and an etalon 54 are arranged in the path of rays of the light beam 32 emitted by the semiconductor laser 10. The etalon has the function to ensure that the semiconductor laser is operated in just one mode. As already mentioned above, semiconductor lasers are very wide-banded. Due to this fact, several of the resonant frequencies of the ring resonator can get into resonance with the laser. A certain one of these resonant frequencies is selected by the etalon. Instead, also other filter means can be provided. For example, the end reflector 44 remote from the ring resonator can be replaced by a grating, which reflects back in the incident direction just one of the different resonant frequencies of the ring resonator 12.

Figure 6:
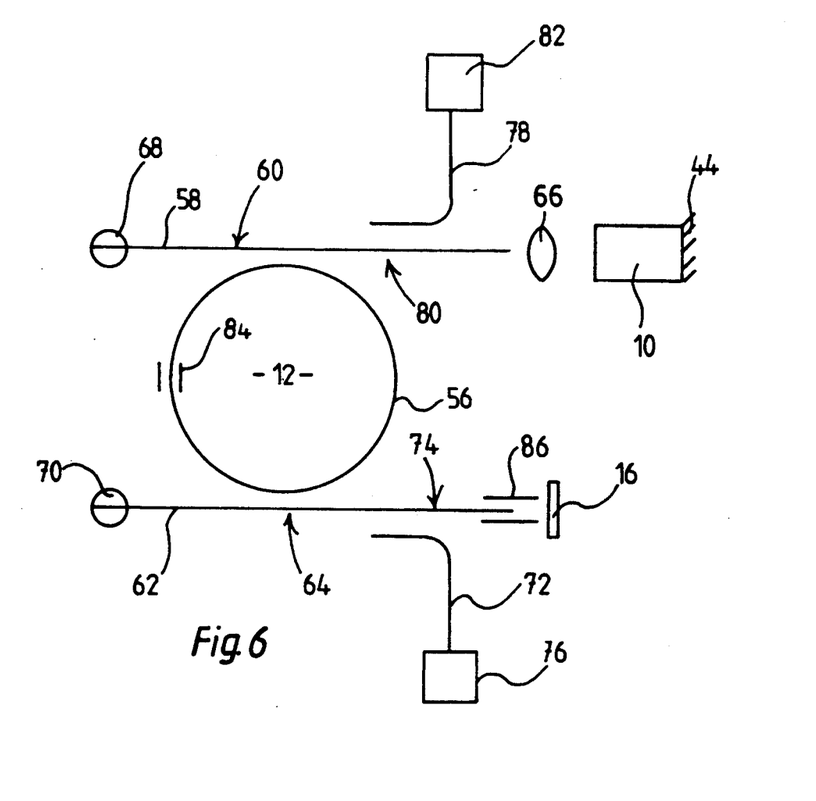
FIG. 6 is a schematic illustration of a realization of the measuring device with an integrated optical system.

FIG. 6 shows a measuring device, which is constructed with an integrated optical system, that means that waveguides are embedded in a substrate for guiding the light. In FIG. 6 numeral 10 again designates a semiconductor laser. The ring resonator 12 is an integrated optical resonator formed by a closed circular waveguide 56. A straight laser waveguide 58 is arranged on one side of this closed waveguide 56. The laser waveguide 58 extends substantially tangential to the closed waveguide 56 and slightly spaced therefrom. Thereby the laser waveguide 58 is optically connected to the closed waveguide 56. Part of the light guided in the laser waveguide 58 passes to the closed waveguide 56 in a coupling point 60, and vice versa. An end reflector waveguide 62 is arranged on the other side of the closed waveguide 56. The end reflector waveguide 62 is likewise optically connected to the closed waveguide 56 in a coupling point 64. The laser beam from the semiconductor laser 10 is applied to the laser waveguide 58 through a coupling-in optical system 66. An end reflector 16 is arranged relative to the end reflector waveguide 62 such that the light of a first direction of propagation coupled out of the closed waveguide into the end reflector waveguide is refected back again by the end reflector 16 into the end reflector waveguide and partially coupled again into the closed waveguide in a second opposite direction of propagation.

Thus, light from the semiconductor laser 10 is guided from the right to the left in FIG. 6 to the laser waveguide 58. This light is partially coupled into the closed waveguide 56. This light then propagates around in the closed waveguide in a first direction of propagation, that is counter-clockwise in FIG. 6. Part of the light thus propagating around counter-clockwise is coupled into the end reflector waveguide 62 in the coupling point 64. Then it propagates from the left to the right in FIG. 6 in the end reflector waveguide 62 to the end reflector 16. The light reflected by the end reflector 16 propagates back in the end reflector waveguide 62 from the right to the left, is partially coupled again into the closed waveguide 56 in the coupling point 64 and passes through the closed waveguide 56 this time in the second direction of propagation, that is clockwise in FIG. 6. Part of this light is coupled again into the laser waveguide 58 in the coupling point 60 and propagates back to the semiconductor laser 10. A reflecting layer 44 is provided on the side of the semiconductor laser 10 remote from the ring resonator 12.

In this way the end reflector 16 has again the function of generating a light wave propagating around in the ring resonator 12 in the second direction of propagation. It has again the function of limiting the resonator cavity together with the reflecting layer 44. The semiconductor laser 10 is tuned to the frequency of the light propagating around in the second direction of propagation. In this respect the function of the measuring device of FIG. 6 is similar to the one of FIG. 5.

The laser waveguide 58 is connected to a light trap 68 at its end remote from the semiconductor laser 10. This light trap 68 prevents the light guided from the semiconductor laser 10 to the laser waveguide 58 and not coupled into the closed waveguide 56 from being reflected at said end. In the same way the end reflector waveguide 62 is connected to a light trap 70 at its end remote from the end reflector 16.

A first detector waveguide 72 is optically connected in a coupling point 74 to the end reflector waveguide 62 between the point of the optical coupling with the closed waveguide 56 (coupling point 64) and the end reflector 16. This first detector waveguide 72 leads to a first photoelectrical detector 76. The optical coupling in the coupling point 74 is such, that by the first detector waveguide 62 part of the light guided by the closed waveguide toward the end reflector 16 and having passed through the closed waveguide in the first direction of propagation is guided to the first detector 76. A second detector waveguide 78 is optically connected in a coupling point 80 to the laser waveguide between the point of the optical coupling with the closed waveguide (coupling point 60) and the semiconductor laser 10. This second detector waveguide 78 leads to a second photoelectrical detector 82. The optical coupling in the coupling point 80 is such, that by the second detector waveguide part of the light guided by the closed waveguide 56 through the laser waveguide toward the semiconductor laser 10 is guided to the second detector 82.

A first phase modulator 84 is provided at the closed waveguide 56. A second phase modulator 86 is provided at the end reflector waveguide 62 between the coupling point 64 and the end reflector 16. The phase modulator 86 of FIG. 6 has exactly the same effect as the movement of the end reflector 16 by the correcting element 44 in the embodiment of FIG. 5. Also in the measuring device of FIG. 6 the semiconductor laser 10 is tuned to the frequency of the light wave propagating around in the ring resonator in the second direction of propagation. Alternating signals of the detectors 76 and 82 having the modulation frequency are generated by the phase modulation. This alternating signals are functions of the optical path lengths in the closed waveguide 56 according to the curves 20 and 22.

Figure 7:
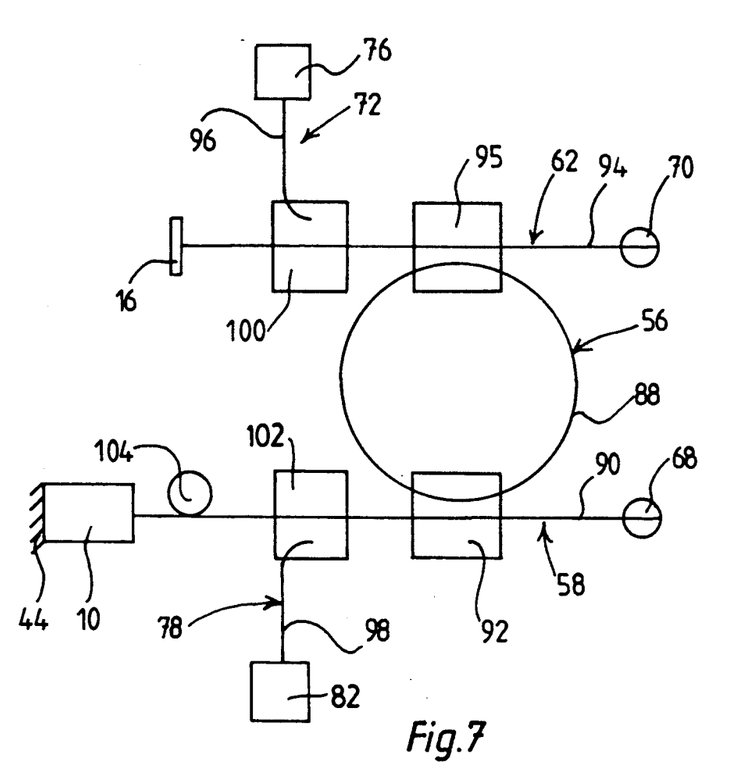
FIG. 7 is a schematic illustration of a realization of the measuring device with a fiber optical system.

FIG. 7 shows a measuring device, in which the light is guided through fibers as waveguides. The construction of the measuring device of FIG. 7 is similar to that shown in FIG. 6. Corresponding elements are designated by the same numerals in FIG. 7 as in FIG. 6.

The ring resonator 12 comprises a closed light-piping fiber ring 88 as closed waveguide 56. The laser waveguide 58 is formed by a light-piping fiber 90. The fiber 90 is optically connected to the fiber ring 88 through a fiber coupler 95. Also the end reflector waveguide 62 is formed by a light-piping fiber 94. The fiber 94 is optically connected to the fiber ring 88 through a fiber coupler 96. Also the first and the second detector waveguides 72 and 78, respectively, are formed by a light-piping fibers 96 and 98, respectively, which are optically connected to the fiber ring 56 by means of a fiber coupler 100 and 102, respectively. Each of the fibers 96 and 98 guides the light to one of the detectors 76 and 82, respectively. The fiber coupler 100 is arranged between the fiber coupler 95 and the end reflector 16. The fiber coupler 102 is arranged between the fiber coupler 92 and the semiconductor laser 10. The fiber couplers 100 and 102 are arranged such, that they guide part of the light coupled out of the fiber ring 88 into the end reflector waveguide 62 and into the laser waveguide 58, respectively, to the detector waveguides 72 and 78, respectively, and thus to the detectors 76 and 82, respectively.

In the arrangement according to FIG. 7 a phase modulator 104 is arranged between the semiconductor laser 10 and the fiber coupler 102 in the laser waveguide 58.

The function of the measuring device according to FIG. 7 is substantially the same as the function of the measuring device according to FIG. 6.

Figure 8:
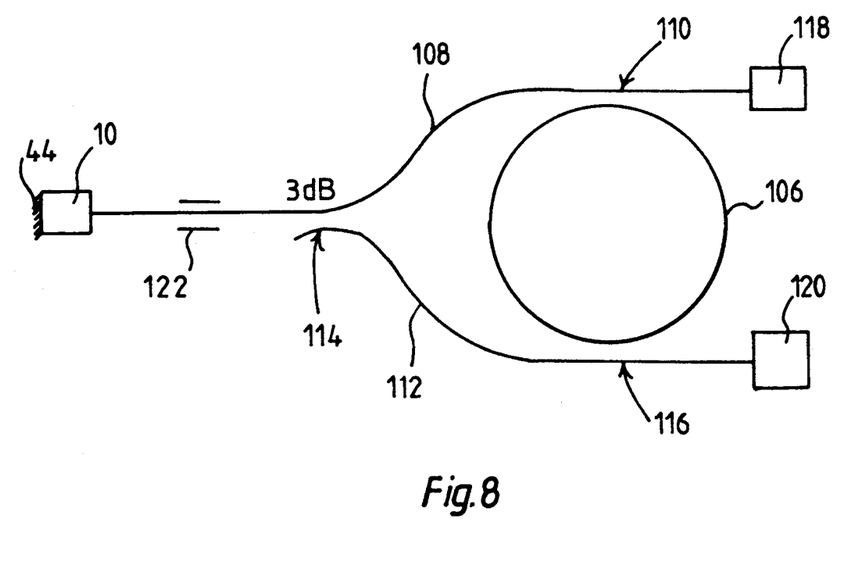
FIG. 8 is a schematic illustration of a modified embodiment of the measuring device.

FIG. 8 shows a modified embodiment of the measuring device, in which the end reflector can be omitted.

In the measuring device according to FIG. 8 the ring resonator 12 comprises a closed waveguide 106. The closed waveguide 106 can be a waveguide fabricated as integrated optical system of the type of FIG. 6 or a fiber ring similar to FIG. 7. The laser beam from the semiconductor laser 10 is applied to a first waveguide 108. On one side of the closed waveguide 106 the first waveguide 108 is optically connected to this closed waveguide 106 through a coupling point or a fiber coupler 110. Thereby a light wave is generated, which propagates around in the closed waveguide 106 in a first direction of propagation, namely clockwise in FIG. 8. A second waveguide 112 is optically connected to the first waveguide 108 through a coupling point or a fiber coupler 114. The coupling point or the fiber coupler 114 is arranged between the semiconductor laser 10 and the point of the optical connection of the first waveguide 108 and the closed waveguide 106, that is the coupling point of the fiber coupler 110. In this way the light originating from the laser is divided in two partial light beams, one of which propagates in the first waveguide 108 and the other one of which propagates in the second waveguide 112. On the side opposite the first waveguide 108 the second waveguide 112 is optically connected to the closed waveguide 106 through a coupling point or a fiber coupler 116 such, that a light wave propagating around in the closed waveguide 106 in the second direction of propagation is generated.

The first and the second waveguides 108 and 112, respectively, are arranged tangentially to the closed waveguide 106. Thereby the light in the first direction of propagation is coupled from the semiconductor laser 10 through the first waveguide 108 into the closed waveguide 106 as well as coupled out of the closed waveguide 106 into the first waveguide 108. In the same way the light in the second direction of propagation is coupled from the semiconductor laser 10 through the second waveguide 112 into the closed waveguide 106 as well as coupled out of the closed waveguide 106 into the second waveguide 112. A first photoelectrical detector 118 is arranged at the end of the first waveguide 108 remote from the semiconductor laser 10. A second photoelectrical detector 120 is arranged at the end of the second waveguide 112 remote from the semiconductor laser 10.

A phase modulator 122 is provided in the part of the first waveguide 108 between the semiconductor laser 10 and the point of the optical connection with the second waveguide 112.

In this arrangement an additional optical element, namely the end reflector, can be omitted. The ring resonances of the two directions of propagation are stimulated symmetrically.

In principle, the described measuring devices can also be constructed in such a way, that external modulators are omitted and, instead, the semiconductor laser 10 is directly modulated. Semiconductor lasers can be modulated at very high-frequencies through the control of their injection current. This can be advantageous, when the band width of the external modulator is not sufficient for the desired detection method. The tuning to the ring resonator can be effected by variation of the bias current of the semiconductor laser.

We claim:

1. A measuring device with a laser and a ring resonator for measuring a quantity by which the optical path lengths of the ring resonator for two light waves propagating in opposite directions in the ring resonator are changed in opposite directions, comprising
    (a) a passive ring resonator defining a first direction of propagation of light and a second, opposite direction of propagation of light,
    (b) a laser arranged outside the ring resonator and means for optically coupling said laser with said ring resonator to provide a first light wave propagating in said ring resonator in said first direction of propagation of light and a second light wave propagating in said ring resonator in said second direction of propagation of light,
    (c) said coupling means coupling said laser with said ring resonator in optically unisolated manner, whereby the ring resonator is part of a resonator cavity of the laser,
    (d) first detector means for providing a first signal indicative of the intensity of said light wave propagating in said ring resonator in said first direction of propagation of light, and providing a first output signal.
    (e) second detector means for providing a second signal indicative of the intensity of said light wave propagating in said ring resonator in said second direction of propagation of light, and providing a second output signal,
    (f) modulator means controlled by said first signal for influencing said ring resonator, when said laser and ring resonator system deviates from resonance due to said quantity to be measured, to match the frequency of the laser with the optical path length for the light wave propagating in said first direction of propagation of light, and
    (g) output means for providing from said second output signal a signal indicative of said quantity.

2. Measuring device as set forth in claim 1, characterized in that
    (a) the resonator cavity of the laser is limited on the side of the ring resonator by an end reflector, and
    (b) said end reflector of the laser is optically arranged on the side of the ring resonator remote from laser, such that
    the light wave emitted by laser passes through the ring resonator in the first direction of propagation and impinges upon the end reflector, and
    the light wave reflected by the end reflector passes through the ring resonator in the opposite second direction of propagation.

3. Measuring device as set forth in claim 1, characterized in that the laser, is a semiconductor laser, which is coated to reduce reflection by reflection reducing means on the side of the ring resonator.

4. Measuring device as set forth in claim 3, characterized in that filter means are provided in the resonator cavity, which filter means are tuned to one of the different resonant frequencies of the ring resonator.

5. Measuring device as set forth in claim 4, characterized in that the filter means are formed by an etalon.

6. Measuring device as set forth in claim 4, characterized in that, as filter means, the end reflector remote from the ring resonator is formed as a grating, which reflects one of the different resonant frequencies of the ring resonator in the direction of incidence.

7. Measuring device as set forth in claim 2 characterized in that
    (a) the ring resonator has four mirrors arranged in the corners of a rectangle and inclined relative to the direction of the rays to guide the light in the first and the second directions of propagation along a closed path,
    (b) a first one of these mirrors, which is adjacent to the laser, is partially transparent for the entering of the laser beam into the ring resonator,
    (c) a second one of these mirrors is partially transparent,
    (d) the light passing through the ring resonator in the first direction of propagation and passing through the second mirror impinges upon the end reflector, which refects it in the incident direction, such that part of this reflected light again passes through the second partially transparent mirror and passes through the ring resonator in the second direction of propagation.

8. Measuring device as set forth in claim 7, characterized in that
   (a) the end reflector is a mirror arranged perpendicular to the direction of the rays,
   (b) this mirror is arranged on a correcting element, which is longitudinally variable in the direction of the rays by an electrical signal, and
   (c) a modulation signal is applied to the correcting element, the correcting element and the mirror forming the end reflector representing components of said modulation means for the modulation of the laser light.

9. Measuring device as set forth in claim 8, characterized in that
   (a) a controller is provided, to which the signal from the detector is applied, upon which detector the light impinges, which has passed through the ring resonator in the second direction of propagation,
   (b) the controller is adapted to apply a direct current signal to the correcting element, such that, in the signal from the detector, the component having the phase modulator frequency is corrected to zero.

10. Measuring device as set forth in claims 8, characterized in that the correcting element is a piezo-actuator.

11. Measuring device as set forth in claim 7, characterized in that
    (a) a third one of the mirrors forming the ring resonator is partially transparent, part of the light propagating around in the first direction of propagation in a first partial beam and part of the light propagating around in the second direction of propagation in a second partial beam passing through the third partially transparent mirror,
    (b) the light of the first partial beam impinges upon a first detector, and
    (c) the light of the second partial beam impinges upon a second detector, the two detectors forming parts of said detector arrangement, which responds to the differences of the light waves propagating around in the first and the second direction of propagation.

12. Measuring device as set forth in claim 2, characterized in that
    (a) the ring resonator is a closed waveguide,
    (b) a laser waveguide is arranged on one side of this closed waveguide and optically connected to said closed waveguide, to which the laser beam from a laser is applied,
    (c) an end reflector waveguide is arranged on the other side of this closed waveguide and optically connected to the closed waveguide,
    (d) the end reflector is arranged relative to the end reflector waveguide such that the light of the first direction of propagation coupled out of the closed waveguide into the end reflector waveguide is reflected by the end reflector back into the end reflector waveguide and partially coupled in again into the second direction of propagation into the closed waveguide.

13. Measuring device as set forth in claim 12, characterized in that
    (a) the closed waveguide is an integrated optical resonator, and
    (b) the laser beam from the laser is applied to the laser waveguide through a coupling-in optical system.

14. Measuring device as set forth in claim 13, characterized in that
    (a) a first phase modulator is provided at the closed waveguide, and/or
    (b) a second phase modulator is provided at the end reflector waveguide between the point of the optical connection to the closed waveguide and to the end reflector.

15. Measuring device as set forth in claims 12, characterized in that light traps are arranged at the ends of the laser waveguide and the end reflector waveguide, respectively, which ends are opposite the laser and the end reflector.

16. Measuring device as set forth in claim 12, characterized in that
    (a) a first detector waveguide is optically connected to the end reflector waveguide between the point of the optical connection to the closed waveguide and the end reflector, through which detector waveguide part of the light guided by the closed waveguide in direction toward the end reflector and having passed through the closed waveguide in the first direction of propagation is guided to a first detector, and
    (b) a second detector waveguide is optically connected to the laser waveguide between the point of the optical connection to the closed waveguide and the laser, through which detector waveguide part of the light guided by the closed waveguide through the laser waveguide in direction toward the laser is guided to a second detector.

17. Measuring device as set forth in claim 12, characterized in that
    (a) the closed waveguide is formed by a light piping fiber ring,
    (b) the laser waveguide is formed by a light piping fiber, which is optically connected to the fiber ring through a fiber coupler,
    (c) the end reflector waveguide is formed by a light piping fiber, which is optically connected to the fiber ring through a fiber coupler.

18. Measuring device as set forth in claim 12 wherein
    (a) a first detector waveguide is optically connected to the end reflector waveguide between the point of the optical connection to the closed waveguide and the end reflector, through which detector waveguide part of the light guided by the closed waveguide in direction toward the end reflector and having passed through the closed waveguide in the first direction of propagation is guided to a first detector,
    (b) a second detector waveguide is optically connected to the laser waveguide between the point of the optical connection to the closed waveguide and the laser through which detector waveguide part of the light guided by the closed waveguide through the laser waveguide in direction toward the laser is guided to a second detector,
    (c) the closed waveguide is formed by a light piping fiber ring,
    (d) the laser waveguide is formed by a light piping fiber, which is optically connected to the fiber ring through a fiber coupler,
    (e) the end reflector waveguide is formed by a light piping fiber, which is optically connected to the fiber ring through a fiber coupler, and
    (f) wherein the first and the second detector waveguide is formed by a light piping fiber each, which are optically connected to the fiber ring by means of a fiber coupler each.

19. Measuring device as set forth in claim 18, wherein an additional fiber coupler optically connects the light-piping fiber that forms the laser waveguide to the light-piping fiber that forms the second detector waveguide, said additional fiber coupler arranged between the laser and the other said fiber coupler for optical connection of the laser waveguide to the fiber ring.

20. Measuring device as set forth in claim 18, wherein an additional fiber coupler optically connects the light-piping fiber that forms the end reflector waveguide to the light-piping fiber that forms the first detector waveguide said additional fiber coupler arranged between the end reflector and the other said fiber coupler for optical connection of the end reflector waveguide to the fiber ring.

21. Measuring device as set forth in claim 1, characterized in that
   (a) the ring resonator comprises a closed waveguide,
   (b) the laser beam from the laser is applied to a first waveguide and this first waveguide is optically connected to the laser on one side of the closed waveguide, such that a light wave propagating around in the closed waveguide in the first direction of propagation is generated,
   (c) a second waveguide is optically connected to the first waveguide between the laser and the point of the optical connection of the first waveguide and the closed waveguide to the first waveguide,
   (d) the second waveguide is optically connected to the closed waveguide on the side opposite the first waveguide, such that a light wave propagating around in the closed waveguide in the second direction of propagation is generated.

22. Measuring device as set forth in claim 21, characterized in that
   (a) the first and the second waveguide are arranged tangentially to the closed waveguide, such that the light in the first direction of propagation is coupled out of the laser into the closed waveguide through the first waveguide as well as coupled out of the closed waveguide into the first waveguide, and the light in the second direction of propagation is coupled out of the laser into the closed waveguide through the second waveguide as well as coupled out of the closed waveguide into the second waveguide, and
   (b) detectors are arranged at the ends of the first and the second waveguides remote from the laser.

23. Measuring device as set forth in claim 21, characterized in that a phase modulator is provided in the portion of the first waveguide between the laser and the point of the optical connection to the second waveguide.

* * * * *